US012654072B1

(12) United States Patent
Stone et al.

(10) Patent No.: US 12,654,072 B1
(45) Date of Patent: Jun. 16, 2026

(54) PET TOY WITH OVERMOLDED OUTER COVERS AND METHODS OF MANUFACTURE FOR THE SAME

(71) Applicant: Guru Pet Company, Inc., Golden, CO (US)

(72) Inventors: John James Stone, Golden, CO (US); Amy Stone, Golden, CO (US)

(73) Assignee: Guru Pet Company, Inc., Mount Pleasant, SC (US)

( * ) Notice: Subject to any disclaimer, the term of this patent is extended or adjusted under 35 U.S.C. 154(b) by 0 days.

(21) Appl. No.: 18/634,415

(22) Filed: Apr. 12, 2024

Related U.S. Application Data

(60) Provisional application No. 63/459,291, filed on Apr. 14, 2023.

(51) Int. Cl.
*A63B 45/00* (2006.01)
*A01K 15/02* (2006.01)
(52) U.S. Cl.
CPC ............ *A63B 45/00* (2013.01); *A01K 15/026* (2013.01); *A63B 2208/14* (2013.01)
(58) Field of Classification Search
CPC .............. A01K 15/026; A63B 2208/14; A61H 2015/0042; A61H 2015/0007; A61H 2015/0014
See application file for complete search history.

(56) References Cited

U.S. PATENT DOCUMENTS

| | | | |
|---|---|---|---|
| 4,808,272 A * | 2/1989 | Molitor ................. | A63B 45/00 205/70 |
| 2010/0083910 A1* | 4/2010 | Axelrod ............ | B29C 66/73152 264/249 |
| 2013/0231594 A1* | 9/2013 | Bennett ..................... | A61F 7/02 601/19 |
| 2014/0130748 A1 | 5/2014 | Curry et al. | |
| 2015/0128876 A1* | 5/2015 | Axelrod ............... | A01K 15/026 119/709 |
| 2017/0079873 A1* | 3/2017 | Jones ................. | A63B 21/0004 |
| 2018/0310527 A1* | 11/2018 | Yang ...................... | A01K 13/00 |
| 2019/0059329 A1* | 2/2019 | Beatty ................. | A01K 15/026 |
| 2019/0297848 A1* | 10/2019 | Gao ..................... | A01K 15/025 |
| 2022/0272945 A1* | 9/2022 | Jackson .............. | A01K 15/026 |

OTHER PUBLICATIONS

Chewy, Outward Hound Tennis Max Ball Dog Toy, https://www.chewy.com/outward-hound-tennis-max-ball-dog-toy/dp/306260, sales of the described product ranging from approximately Jul. 2022 to Jun. 2023, 5 pages.

* cited by examiner

*Primary Examiner* — Kyle A Cook
(74) *Attorney, Agent, or Firm* — Standley Law Group LLP; James L. Kwak; Adam J. Smith

(57) ABSTRACT

A pet toy and related methods are disclosed. An outer member is overmolded about an inner member which defines an interior void. The outer member is provided in sections, each with apertures, such that sections of the outer member collectively surround, and frictionally engage, the inner member but leave portions of the inner member exposed. The sections are permanently joined along a seam. Reinforcement sections are provided along the seam and extend outward therefrom.

5 Claims, 8 Drawing Sheets

PET TOY WITH OVERMOLDED OUTER COVERS AND METHODS OF MANUFACTURE FOR THE SAME

CROSS-REFERENCE TO RELATED APPLICATIONS

This application claims the benefit of U.S. Provisional Application Ser. No. 63/459,291, filed Apr. 14, 2023, the disclosures of which are hereby incorporated by reference as if fully restated herein.

TECHNICAL FIELD

Exemplary embodiments relate generally to pet toys, such as with overmolded outer covers, and methods of manufacturing the same.

BACKGROUND AND SUMMARY OF THE INVENTION

Pets crave toys to play with, chew on, and stay entertained with. Safety, function, and durability of pet toys are important considerations for any pet owner. There are a variety of commercially available pet toys with different designs and functions—some of which are lacking in various durability and/or safety features.

For example, some pet owners allow their pets to play with standard tennis balls. The relatively small, flexible shape of tennis balls makes them easy to carry by pets, such as dogs, of various size. While they can provide attractive toys, such standard tennis balls can sometimes present dangers, such as when dogs are left to play with them unsupervised. Regardless, standard tennis balls can wear down a dog's teeth. For example, standard tennis balls can become abrasive, and with continued use such as when dirt, rocks and sand become trapped in the fuzz, making them even more coarse. When dogs clamp down on a tennis ball, the outer layer (fuzz) may rub against their teeth, wearing them down. Overtime, this could lead to dental issues. Also, as a dog carries a tennis ball in its mouth, or chews on one, the ball often becomes slimy with the dog's saliva due to the fabric absorbing the saliva. When this happens, it can be difficult or undesirable for a person to grip and remove the slobbery ball from the dog's mouth.

There are pet toy balls that are different than standard tennis balls and may avoid some of the above drawbacks, but they each have their own drawbacks. For example, foam rubber dog balls can be destroyed relatively easily. Balls with a sound generating element, such as a squeaker, may be torn apart by curious pets. Balls that have slick outer coatings may become slimy with the saliva.

Therefore, what is needed is a pet toy that is safe, durable, and entertaining for pets. The present disclosures provide pet toys with overmolded outer covers and methods for manufacturing the same.

As discussed in greater detail herein, exemplary embodiments include, by way of non-limiting example, a durable ball toy that is slobber resistant and relatively easy to remove from a pet's mouth, among other advantages. For example, the disclosed pet toy may be in the general form of a tennis ball with an overmolded outer cage which allows the ball or shape to be more easily pulled out of the pet's mouth, thereby giving the pet owner something to grab onto, and not having to touch the presumably slobber covered felt. The disclosed pet toys may also provide a durable squeaker ball toy having a protected squeaker design for long life. The improved designs are durable, scalable and cost-effective to manufacture, among other advantages.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

Figures 12, 13:
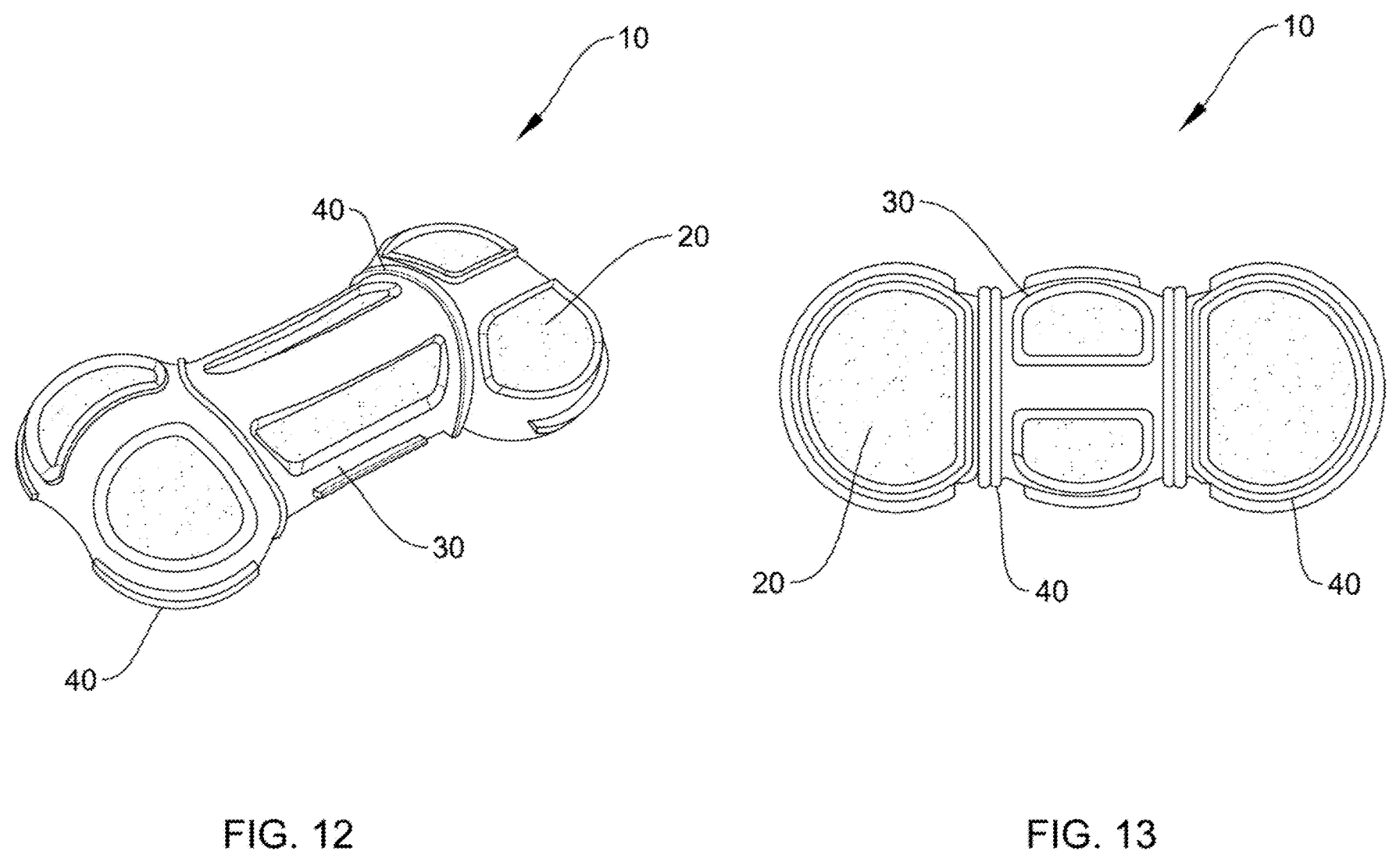

FIG. 12 is a perspective view of another exemplary embodiment of the pet toy;

FIG. 13 is a front view of another exemplary embodiment of the pet toy; and

DETAILED DESCRIPTION OF EXEMPLARY EMBODIMENT(S)

Figure 1:
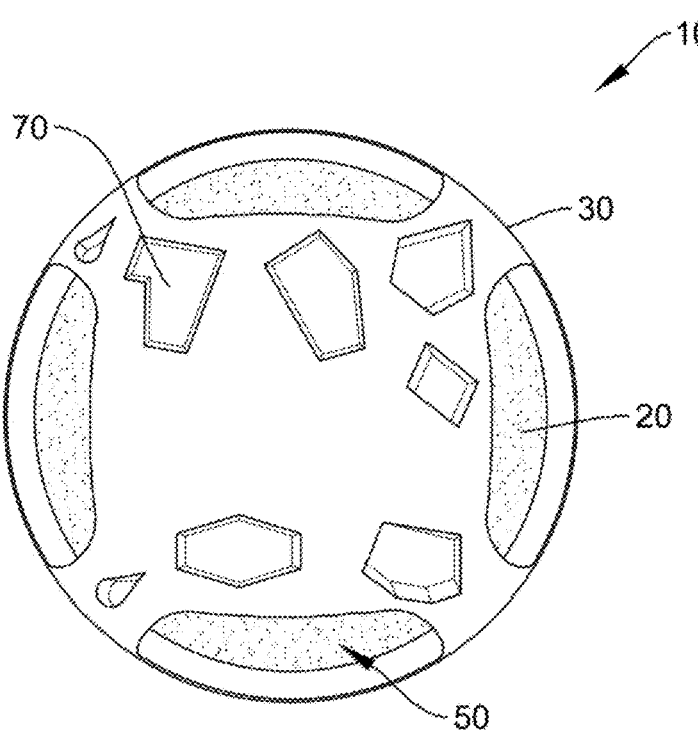
FIG. 1 illustrates a front view of a pet toy according to an embodiment of the invention.
Figure 2:
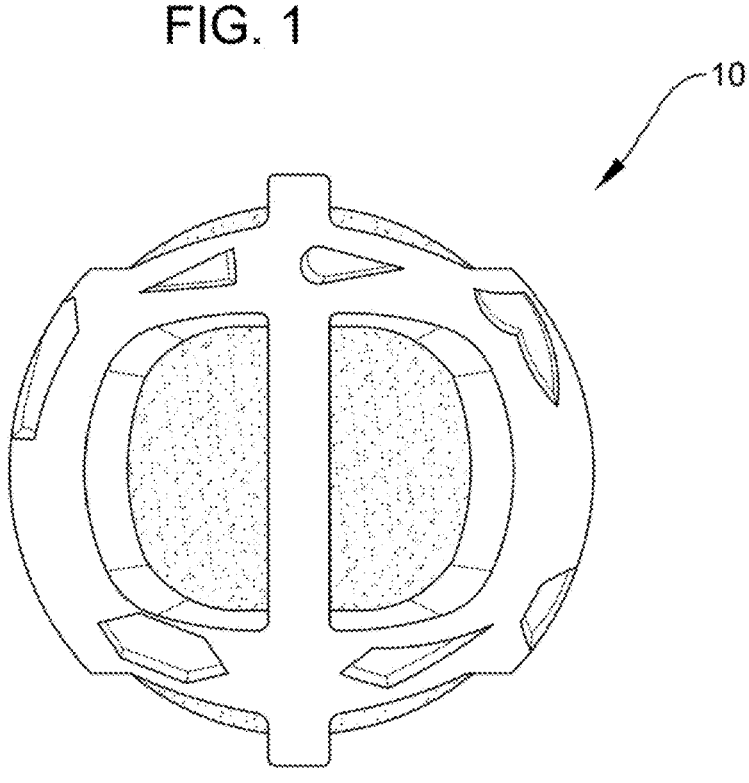
FIG. 2 illustrates a side view of the pet toy of FIG. 1.
Figure 3:
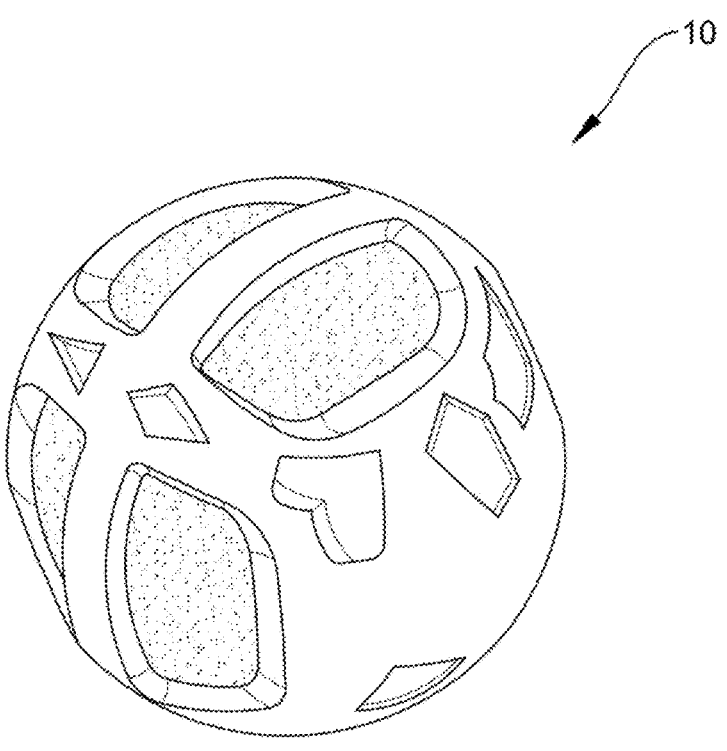
FIG. 3 illustrates a perspective view of the pet toy of FIG. 1.
Figure 4:
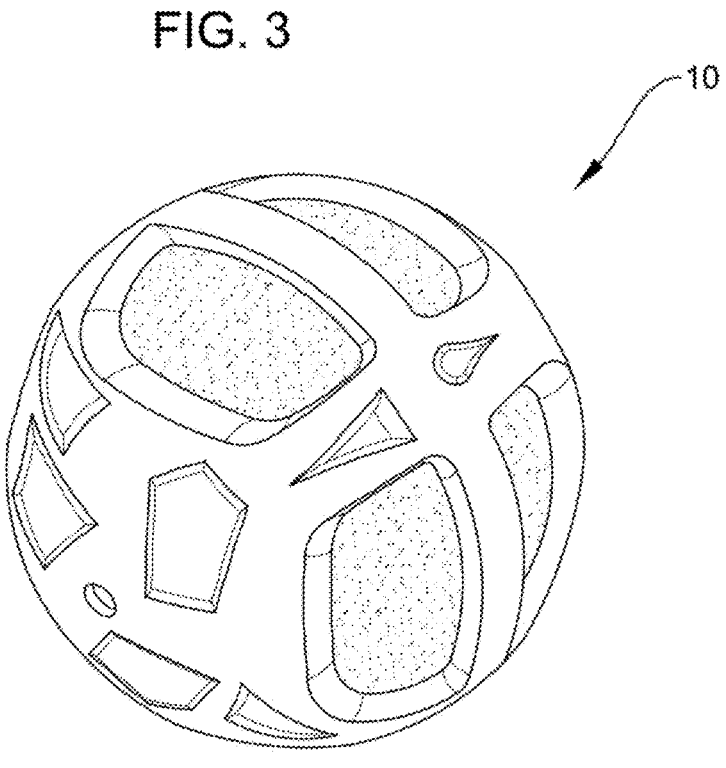
FIG. 4 illustrates another perspective view of the pet toy of FIG. 1.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

FIG. 1 through FIG. 5 illustrate an exemplary embodiment of a pet toy 10, such as for a dog or other animal.

As shown, the toy 10 may be ball-shaped; however, the toy 10 may be provided in any size and/or shape. The toy 10 may include an inner member 20 and an outer member 30. The outer member 30 may be referred to as an outer shell, cover, or overmold. The outer member 30 may fully surround or cover the inner member 20. However, preferably, such as shown, the outer member 30 is formed with one or more openings or apertures 50 defined by the outer member 30. The openings 50 may be provided in any shape, size, configuration, and/or pattern. The inner member 20 may include an inner chamber or hollow section that is at least partially collapsible. The inner member 20 may house or hold a noise generating device, such as a squeaker 400 (described more fully below), inside the inner chamber.

The outer member 30 may comprise one or more ridges 70 or textured surfaces formed therein. Such ridges 70 may be orally stimulating to pets during play, may provide better grip, and/or promote dental health when chewed or gnawed by a pet such as by dislodging materials from teeth. The ridges 70 can be selectively shaped so as to abrade or clean pet teeth and gums during play. Such ridges 70 may have any number or different shapes, sizes, configurations and/or patterns, and are frequently designed for both functional and fanciful considerations. Such shapes may be appealing to pets and pet owners, while also providing dental or other health benefits to such pets.

The toy 10 is not limited to any size. In the embodiments shown and described herein, the toy 10 may comprise a general ball-shape with a 70.5 mm diameter, though any size diameter or other shape may be utilized. Similarly, the inner member 20 may be configured to fit within the outer member 30, and is not limited to any particular diameter or shape. In exemplary embodiments, without limitation, an outer surface of the inner member 20 extends immediately along an inner surface of the outer member 30, though such is not required. Similarly, the material of the inner member 20, which comprises a hollow chamber, is not limited to any particular thickness. In the embodiment shown and described herein, the inner member 20 has a diameter of 64.5 mm, though any diameter or shape may be utilized, and a material thickness of 3.7 mm, though any thickness and/or spacing may be utilized. Similarly, the outer member 30 is not limited to having any particular thickness. It is understood, however, that the thickness of the outer member 30 may provide certain functional and structural benefits and features for the pet toy 10. In the embodiments shown and described herein, the outer member 30 has a thickness of 3.5 mm, though any thickness may be utilized. The thickness of the outer member 30 is an especially important characteristic for toy 10 having a squeaker 400 mounted inside because it is helping to protect the squeaker 400 from the dog and/or improve durability of the toy 10.

The overmolded cover or outer member 30 may enhance the overall strength of the toy 10, such as because the thickness of the toy 10 is greater as compared to single or even multi-layer pet toys, including standard tennis balls. Additionally, the properties of the outer member 30 may allow for a variety of characteristics pertaining to how the pet toy deflects or deforms in response to exterior pressure, such as biting or chewing. For example, the outer member 30 may be formed of a durable material that is strong and resilient to deformation when a dog bites down on or compresses the toy 10. Alternatively, the outer member 30 may be formed of a softer exterior surface that is more easily deformable when a dog bites down on or compresses the toy 10. Likewise, the inner member may be formed of a hard or soft material with varying deformation properties.

Additionally, the overmolded cover or outer member 30 may allow the toy 10 to be more easily pulled out of the dog's mouth than standard pet toys, such as tennis balls, giving the pet owner something to grab onto and not having to touch the often slobbery felt or other outer surface of the inner member 20. Also, due to the outer member 30, there is less surface area of the fabric material to absorb the saliva, making the toy 10 less slobbery than a tennis ball or standard ball with fabric outer layer.

Figure 5:
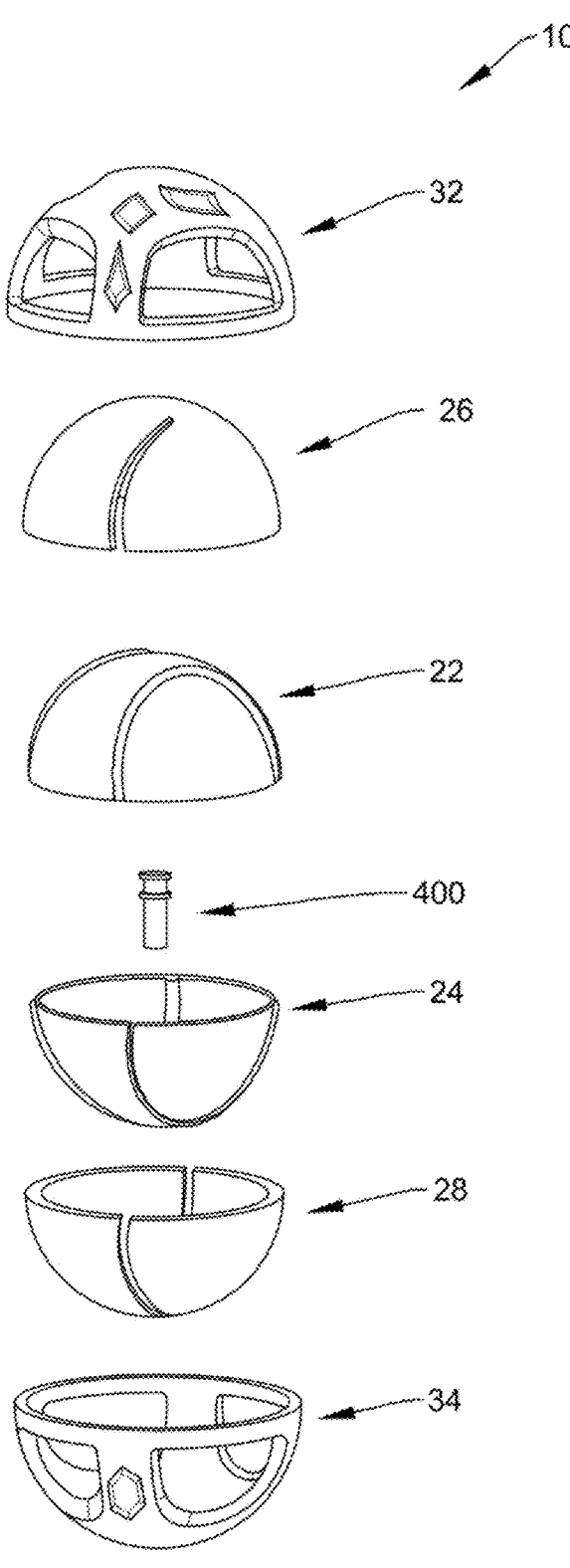
FIG. 5 illustrates an exploded view of the pet toy of FIG. 1.

Referring particularly to FIG. 5, the toy 10 is shown in further detail. The outer member 30 is preferably formed of a flexible and elastomeric material, such as a thermoplastic material. ThermoPlastic Elastomer (TPE) polymer has excellent spring-like quality, high tensile strength (able to withstand wear and tear), and is highly pliable. TPEs are also generally non-toxic and environmentally friendly, making them safer for pets, as well as water-resistant. The outer member 30 may be molded in two separate halves or pieces—a first half may be referred to as an upper outer member 32 and a second half may be referred to as a lower outer member 34.

The inner member 20 is preferably formed of a flexible and elastomeric material. The inner member 20 may be molded in two separate halves or pieces-a first half may be referred to as an upper inner member 22 and a second half may be referred to as a lower inner member 24. Both the upper inner member 22 and the lower inner member 24 may be formed with a bead or protrusion extending partially or fully across the surface. Preferably, the inner member 20 is made from a thermoplastic material that allows the inner member halves 22, 24 to elastically deform in response to pressure applied to the halves, such as the biting or squeezing action of a dog. The inner member halves 22, 24 may be configured to ultimately spring back to their original undeformed shape due to the elastomeric nature of the material used.

Each of the outer member 30 and/or the inner member 20 may be formed from any number of size and/or shape pieces.

Fabric material (e.g., polyester felt) may be provided on or bonded to the exterior surface of the inner member 20. The fabric material may include two separate halves of fabric material—an upper fabric material 26 provided on or bonded to upper inner member 22, and a lower fabric material 28 separately provided on or bonded to lower inner member 24, though such is not required. Other materials may be utilized in alternative or addition.

The inner member 20 may be formed having a squeaker mounting structure connected to one or more interior surfaces of the inner member 20, which may optionally extend into the interior chamber of the inner member 20 (the speaker mounting structure is not required as the squeaker 400 is not a required feature). The squeaker mounting structure may be connected at one or both of an interior surface of either of the lower inner member 24 or upper inner member 22. Thus, the squeaker 400 may be incorporated by provision of the squeaker mounting structure which connects to an interior surface of the outer member 30 and extends into the interior chamber of the toy 10 through corresponding openings in the inner member 20 and fabric material. Accordingly, the squeaker 400 may be maintained in a protected position making it more difficult for a pet to access the squeaker 400. Thus, where a squeaker 400 is inserted into the squeaker mounting structure, an undercut of the top flange of the squeaker mounting structure may be configured to hold the squeaker 400 in place (e.g., FIG. 7). The term "squeaker" as used herein may be defined to include any device that produces sound when air is passed through it. A squeaker typically includes a thin piece of material or reed that vibrates when sound passes through the device, thereby generating the sound.

Figure 6:
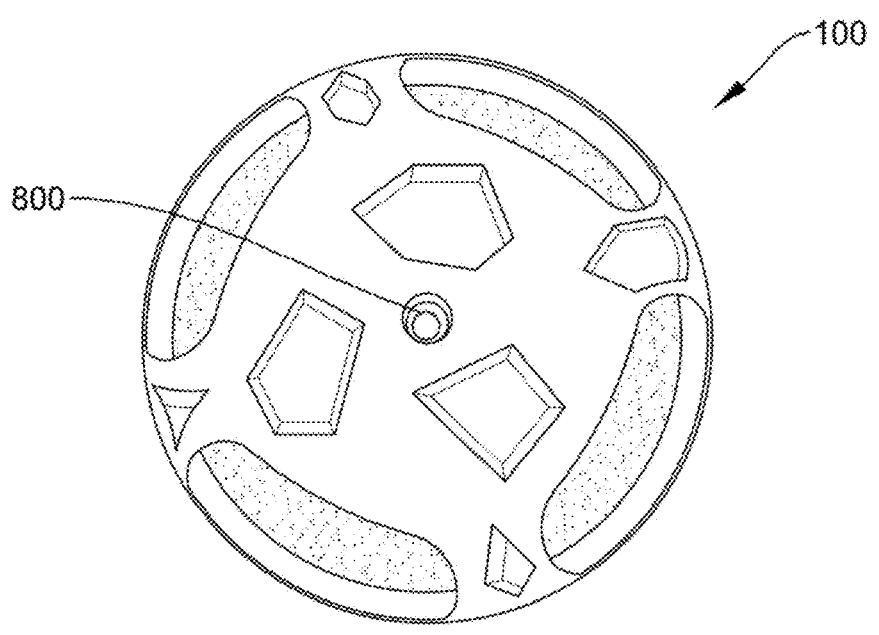
FIG. 6 illustrates a bottom view of a pet toy having an aperture formed therein to generate sound according to an embodiment of the invention.
Figure 7:
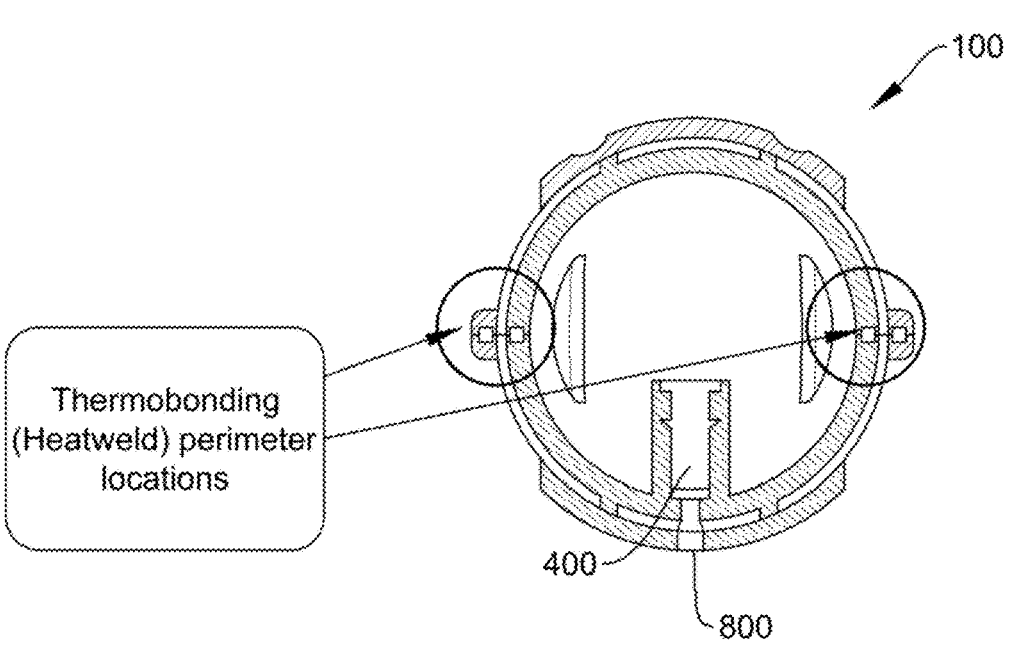
FIG. 7 illustrates a cross-sectional view of the pet toy shown of FIG. 6.

Referring to FIG. 6 and FIG. 7, a second exemplary embodiment of the invention is illustrated. FIG. 6 shows a bottom view of a toy 100 (understood to include a pet or dog toy) having an aperture formed therein to generate sound according to an embodiment of the invention. FIG. 7 is a cross-sectional view of the pet toy shown of FIG. 6. The shape, materials, and configuration of toy 100 may be substantially the same as disclosed for toy 100 of the first embodiment and incorporated by reference for purposes of convenience.

The additional features of toy 100 that are described herein relate generally to the squeaker 400 and squeaker mounting structure. The position of the squeaker 400 is depicted as being located along a center axis of toy 100. It is understood that the invention is not limited to such position. For example, the squeaker 400 may be positioned so that it extends either along a center axis of toy 100, or offset from this center axis in an offset position. The squeaker mounting structure extends inside of the interior chamber of toy 100. The distance that the squeaker extends inside the interior chamber may vary. Moreover, the orientation at which the squeaker 400 extends inside the interior chamber may be varied. Different arrangements may be important depending on the overall shape, configuration, and materials of the pet toy 100.

A squeaker air hole 800 may be provided which allows the toy 100 to emit sound. As shown in FIG. 7, for example, the squeaker air hole 800 may be formed through corresponding surfaces of outer member 30 and inner member 20 (including felt material). In this configuration, the toy 100 mimics or acts like a bellows—the toy 100 may emit a stream of air through the outlet port or aperture when the chamber or hollow section is squeezed or compressed together, such as when a dog or pet bites down on or compresses the toy 100. This stream of pressurized air may be directed through a noise generating device (e.g., reed or thin strip of material) to emit an audible sound—such as a "squeak" like noise; such noise is generally pleasing to a dog (or other pet) when the dog bites down on the toy.

The method and process for manufacturing toy 10, 100 is a significant improvement over conventional methods and processes for making conventional pet toys, such as tennis balls. For example, the current process for manufacturing a tennis ball includes: a) compression molding two halves of a natural rubber inner shell, b) gluing the two rubber halves are together, c) inserting a squeaker either before or after felt fabric (e.g., polyester felt) panels are glued to the outside of the entire rubber ball, d) applying a rubber glue seam to the edges of the polyester felt panels, and e) placing the ball inside a vulcanizer where extreme heat melts the glue seam in place covering the edges of the exposed felt seams and bonds the felt to the rubber ball.

The method and process for manufacturing the toy 10, 100 is much different and improved. Referring to FIGS. 5 and 7, for example, (1) first, the upper inner member 22 and the lower inner member 24 of thermoplastic elastomer TPE material (not natural rubber) inner member 20 are injected molded; (2) next, an upper fabric material 26 (e.g., polyester felt) is bonded to an exterior surface of upper inner member 22, and a lower fabric material 28 (e.g., polyester felt) is separately bonded to a lower inner surface 24—no rubber blue seam need necessarily be applied thereto; (3) next, the two halves are placed into an injection molding press; (4) next, the two halves are overmolded with a TPE material-preferably the overmold material is more durable and harder material than that of the inner member 20—thereby forming the outer member 30, so that (a) the seams of the upper fabric material 26 and lower fabric material 28 are preferably completely covered and protected by the overmold material, (b) the TPE is also over molded over the top edges of the felt and TPR edges on both halves of the ball or shapes, and (c) the overmolding process increases the adhesion strength between the felt and thermoplastic layers over the entire shape; (5) next, the squeaker 400 (if included in toy 10, 100) is inserted into the squeaker cavity, such as to the squeaker mounting structure provided on an interior surface of either of the lower inner member 24 or upper inner member 22 where an undercut of the top flange of the squeaker mounting structure may be configured to hold the squeaker 400 in place; and (6) then the two overmolded halves are thermo-bonded together by using elevated temperature changes (first overmolded half being the upper half including upper outer member 32 provided on upper fabric material 26 that is provided on upper inner member 22; and the second overmolded half being the lower half including lower outer member 34 provided on lower fabric material 28 that is provided on lower inner member 24).

In exemplary embodiments, without limitation, the method and process includes positioning sections of the outer member 30 such that the sections collectively surround, and each frictionally engage, the inner member 20 and the apertures 50 expose portions of the inner member 20, wherein the outer member 30 comprises reinforcement sections 40, each extending along a seam extending between the sections of the outer member 30, wherein the reinforcement sections 40 extend outward from an outer surface of the outer member 40. The reinforcement sections 40 may be spaced apart from one another along the seam in exemplary embodiments.

Thermo-bonding (heat weld) perimeter locations are preferably provided where the two halves adjoin (see, e.g., FIG. 7). While certain exemplary shapes, number of pieces, and/or materials are described and/or shown, other shapes, number of pieces, and/or materials may be utilized.

The disclosed techniques and toy 10, 100 improve durability. For example, with standard tennis balls and tennis shapes, pets may be able to push the squeaker through the squeaker air hole 800. Pets may also be able to tear the fabric material off the natural rubber core ball or shape. This may allow the pet to more easily break the two natural rubber halves apart at the glue seam line.

The overmolding process and feature of the toy 10, 100 may provide a durable cage-like and/or armor-like structure for the ball or shape. For example, the overmolding may completely cover the seams of the felt, thereby protecting the fabric material so the dog is unable to tear the felt panels or other material off the TPE inner core ball or shape without completely destroying the toy 10, 100. The outer member 30 may not be removable from the toy 10, 100 unless the toy 10, 100 is completely destroyed, which may be extremely difficult for many pets. Moreover, the squeaker 400 is protected because it is inserted into the housing before the two halves are thermo-bonded together, not after such as with conventional methods and designs. Also, the TPE overmolding wall thickness protects the squeaker air hole 800 on the outside of the ball or shape so a pet cannot easily push the squeaker through the hole.

Yet another benefit of the toy 10, 100 and techniques disclosed herein is that the overmolded outer member 30 allows the toy 10, 100 to be more easily removed from of a dog's mouth giving a dog owner something to grab onto and not having to touch the often slobbery felt material. There is also less surface area to absorb the saliva into the felt due to outer member 30. With a normal tennis ball, for example, it is almost impossible or too extremely disgusting to remove the slobbery ball from a dog's mouth. Tennis balls or tennis shapes get very slobbery due to the felt fabric all over which absorbs the saliva.

Importantly, the toy 10, 100 and/or techniques disclosed herein provide significant safety benefits for pets and pet owners by providing a slobber barrier, and a TPR raised protective casing around the ball so that the ball can easily be extracted naturally or manually from the dog's mouth.

While use with a dog may be described in some instances, the toy 10, 100 may be used with other types of pets, or even for other applications such as children's toys.

While a ball is described in some instances the toy 10, 100 may be used to create any size, shape, or kind of toy 10, 100. FIG. 8 through FIG. 14, for instance and by way of non-limiting example, illustrate other various exemplary embodiments of the toy 10, and corresponding outer member 30 and inner member 20. Such embodiments may include, without limitation, various spherical shapes (FIG. 8), buoy shapes (FIG. 9), ring shapes (FIG. 10), football shapes (FIG. 11), bone shapes (FIG. 12), dumbbell shapes (FIG. 13), and/or stick shapes (FIG. 14), among other sizes, shapes, and/or configurations. The outer member 30 and/or inner member 20 may be sized, shaped, and/or configured accordingly. These embodiments may comprise some or all of the components and characteristics as other embodiments shown and/or described herein, and/or may be manufacturing using some or all of the techniques shown and/or described herein, though such is not necessarily required.

The toy 10, 100 may comprise one or more raised, reinforcement sections 40 at portions of the outer member 30. These sections 40 may comprise additional material thickness to provide structural reinforcement, enhanced durability, additional grip points, additional cleaning texture, combinations thereof, or the like. The sections 40 may preferably be provided along and atop of at least certain of the heat welded seams to provide extra reinforcement.

Figure 9:
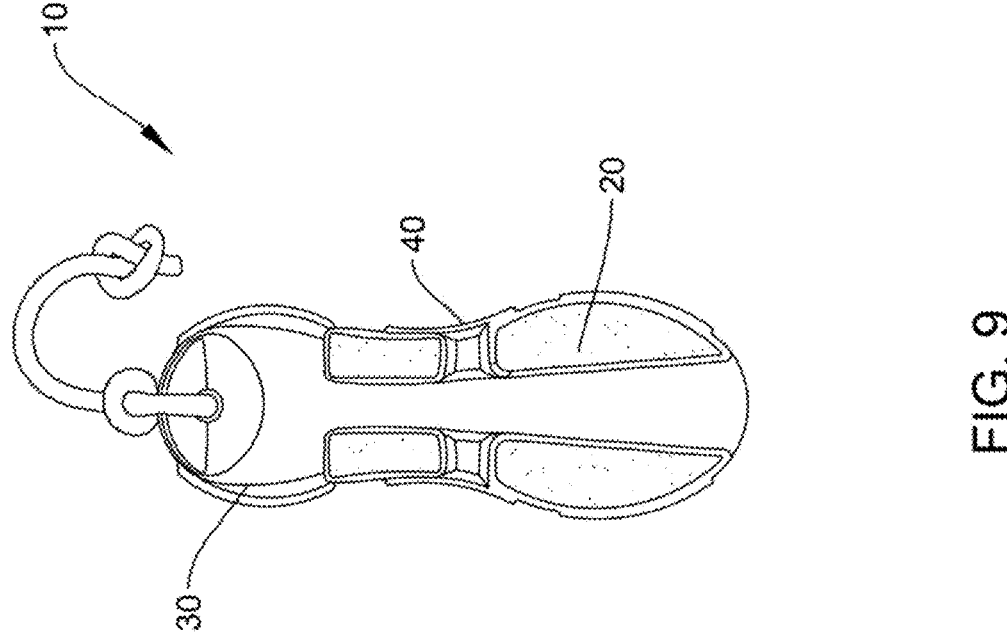
FIG. 9 is a front view of another exemplary embodiment of the pet toy.
Figure 8:
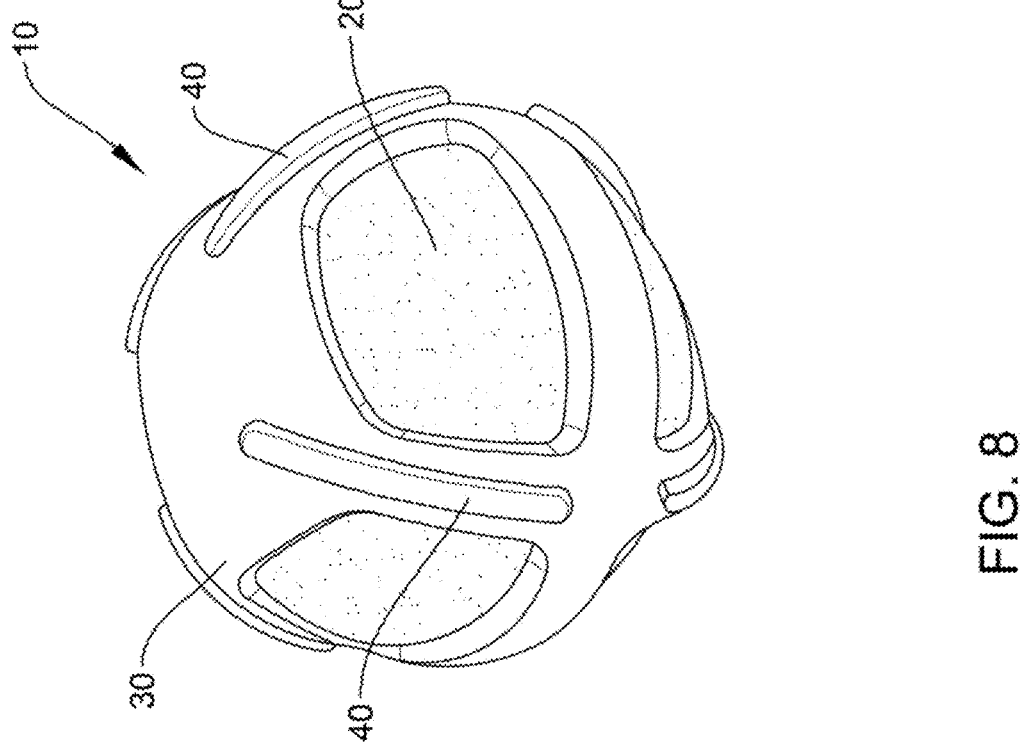
FIG. 8 is a perspective view of another exemplary embodiment of the pet toy.
Figure 11:
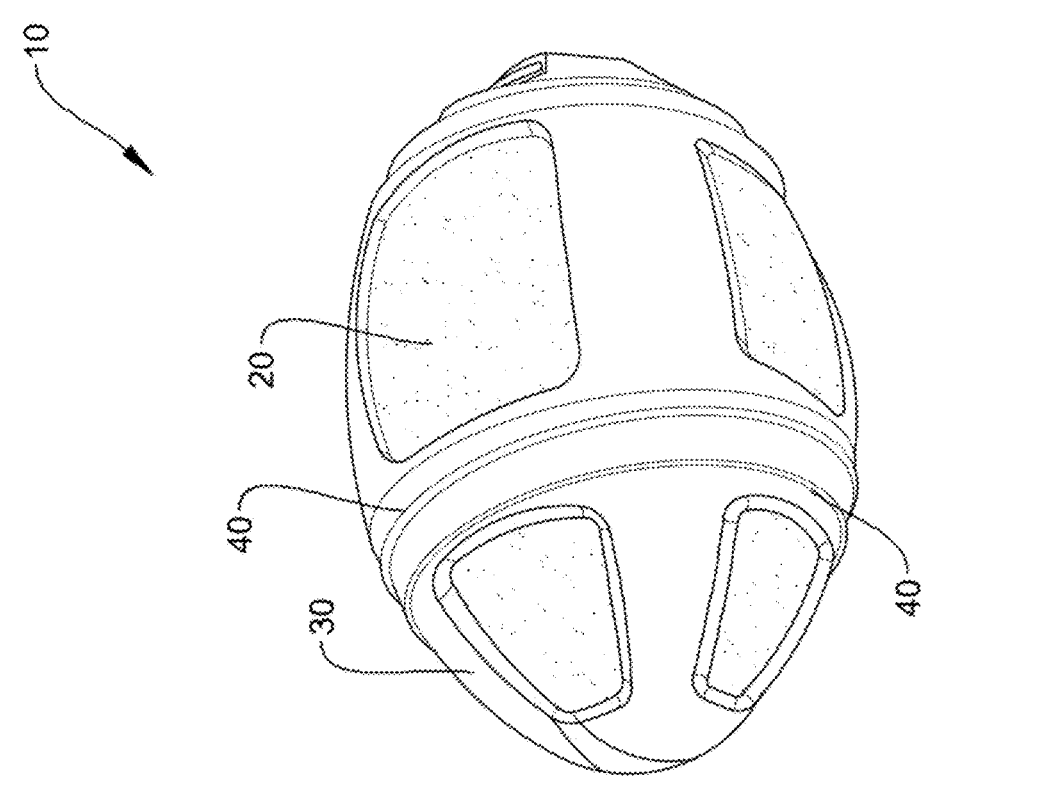
FIG. 11 is a perspective view of another exemplary embodiment of the pet toy.
Figure 10:
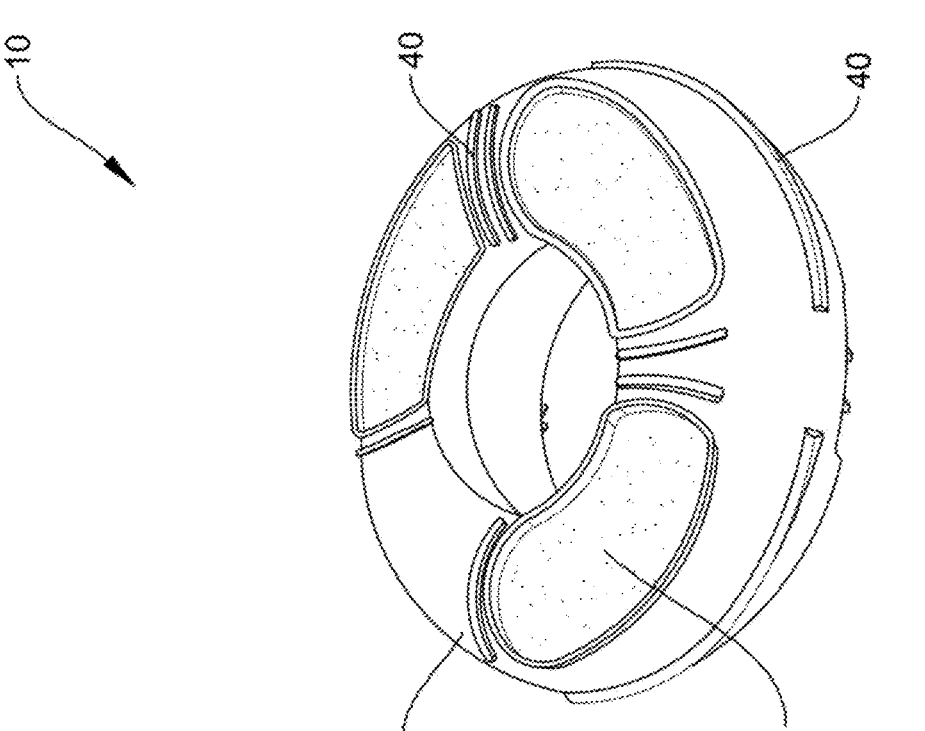
FIG. 10 is a perspective view of another exemplary embodiment of the pet toy.
Figure 14:
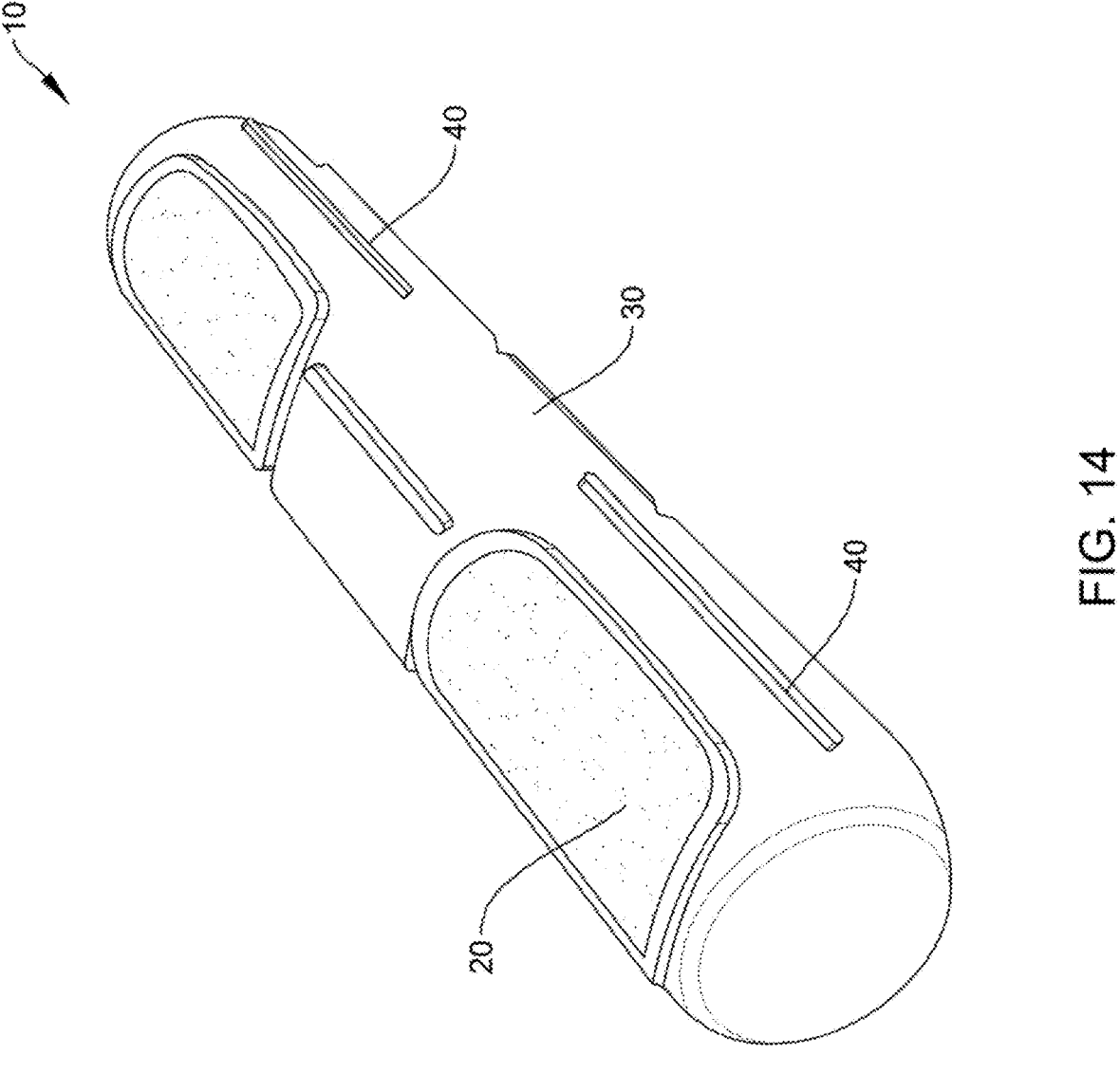
FIG. 14 is a perspective view of another exemplary embodiment of the pet toy.

The toy 10, such as illustrated with particular regard to at least FIG. 9 may comprise one or more apertures 42 configured to accommodate a rope 44 or other line. The apertures 42 may be reinforced, such as by a grommet. This may allow the toy 10 to be handled and/or thrown, for example. The toys 10 may be naturally buoyant, and thus may serve as water toys for pets.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

What is claimed is:

1. A method for producing a pet toy, said method comprising:
   producing an inner member;
   applying a fabric cover to an outer surface of a thermoplastic elastomer portion of the inner member;
   producing multiple sections of an overmolded outer member, each having apertures therein, wherein the outer member comprises the thermoplastic elastomer;
   positioning the sections of the outer member such that the sections collectively surround, and each frictionally engage, the inner member and the apertures expose portions of the inner member, wherein the outer member comprises reinforcement sections, each extending along a seam extending between the sections of the outer member, wherein the reinforcement sections extend outward from an outer surface of the outer member; and
   permanently joining the sections along the seam.

2. The method of claim 1 wherein:
   the pet toy, the inner member, and the outer member each define a non-spherical overall shape.

3. The pet toy of claim 1 further comprising:
   inserting a reeded noisemaking device through the outer member and the inner member into an interior void defined by the inner member such that the reeded noisemaking device is fluidly connected to the interior void and an ambient environment.

4. The method of claim 3 wherein:
   the sections are joined by heat welding.

5. The method of claim 4 wherein:
   the seam entirely circumscribes the outer member;
   the seam extends along a longitudinal midline of the outer member;
   the reinforcement sections are spaced apart from one another along the seam;
   said outer member comprises additional reinforcement sections, each provided at, and extending outward from, the outer surface of the outer member;
   said additional reinforcement sections are longitudinally offset from the seam.

\* \* \* \* \*